Nov. 24, 1964 P. E. OLSON 3,158,070
MULTI-POSITION FLUID MOTOR MECHANISM
Filed March 24, 1961 4 Sheets-Sheet 4

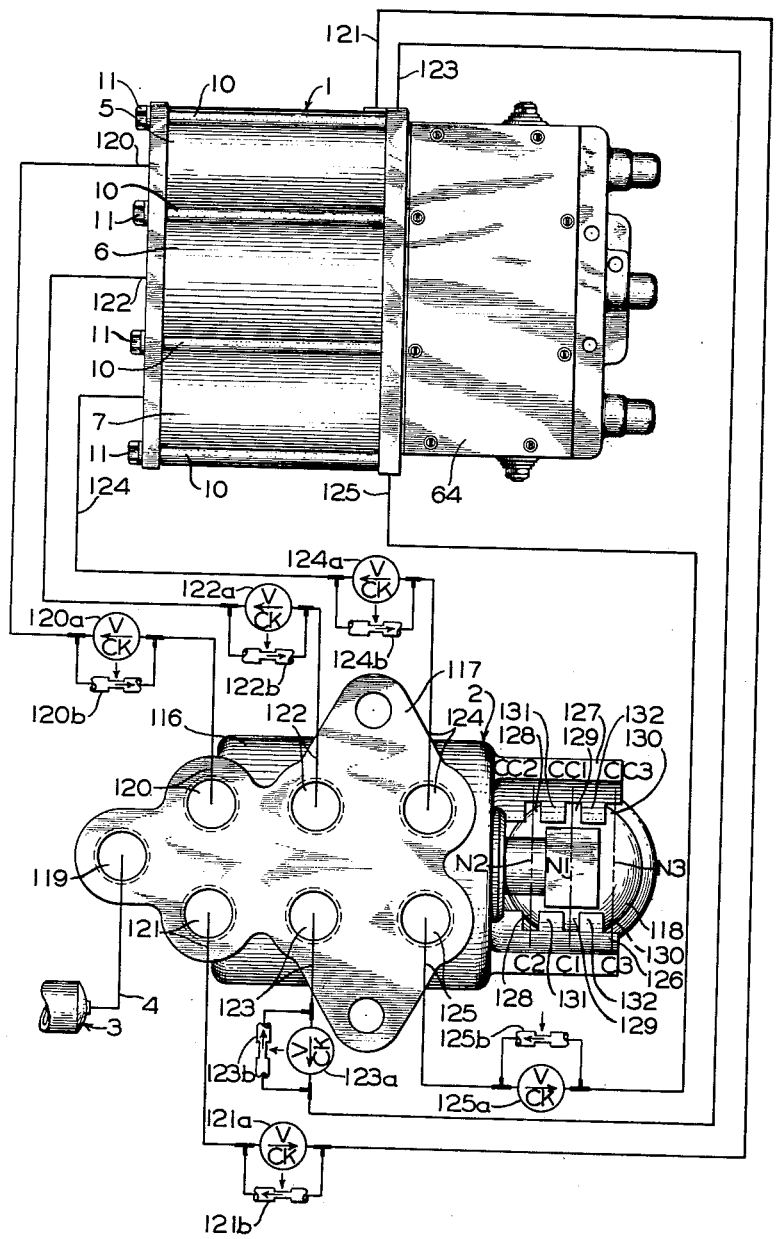

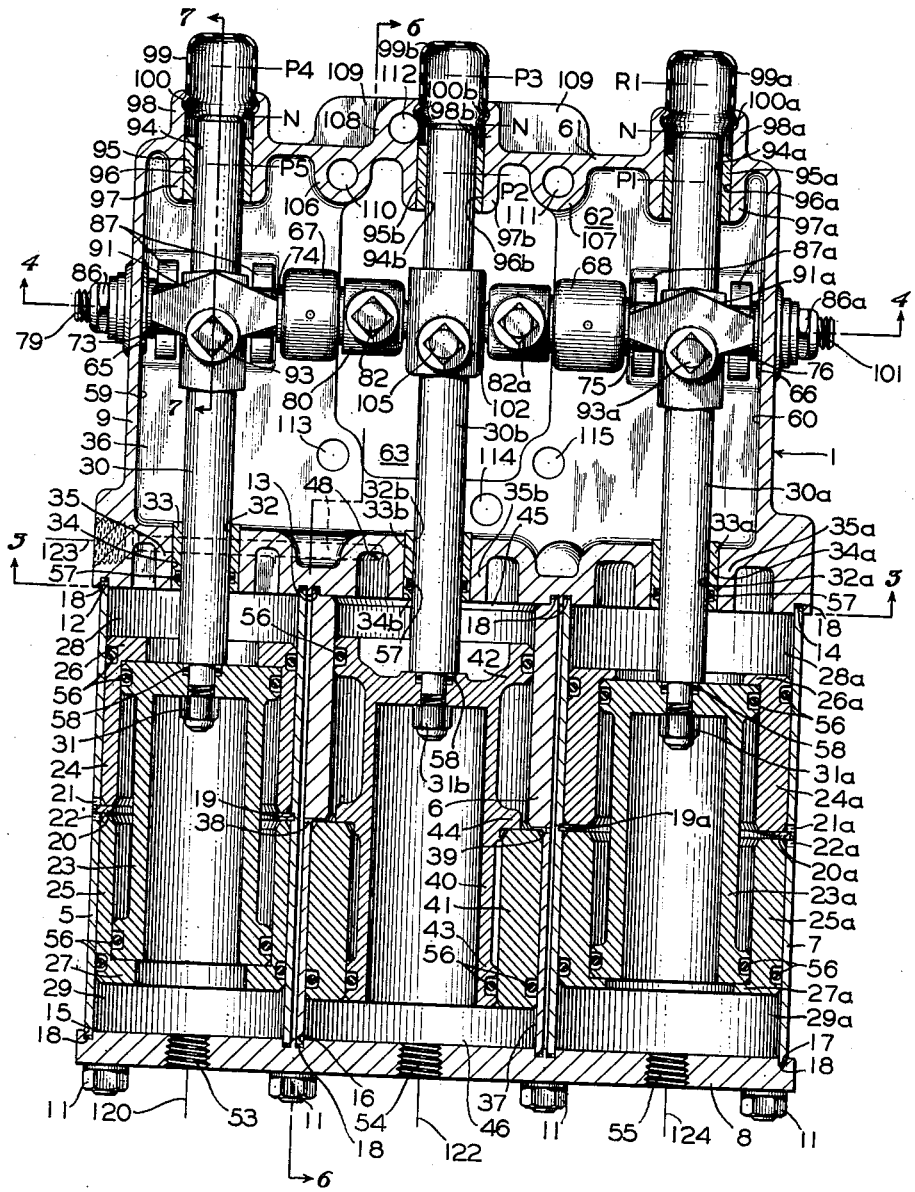

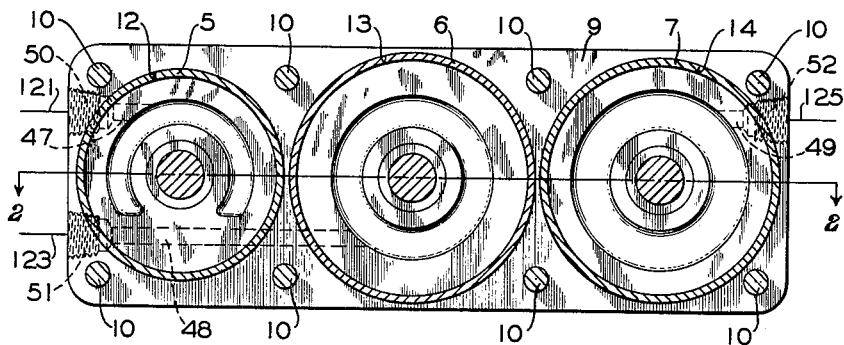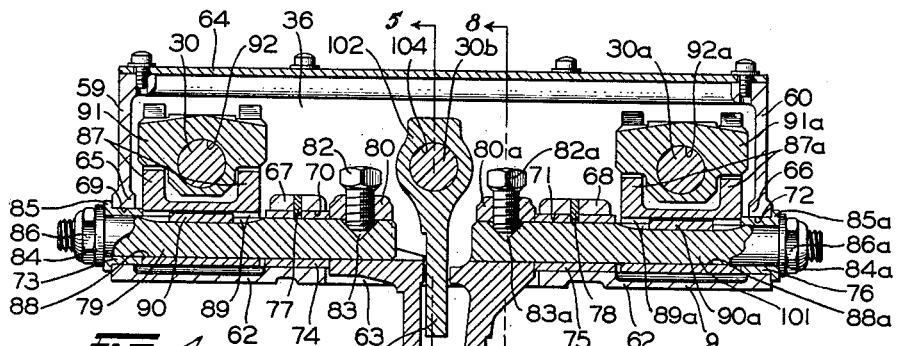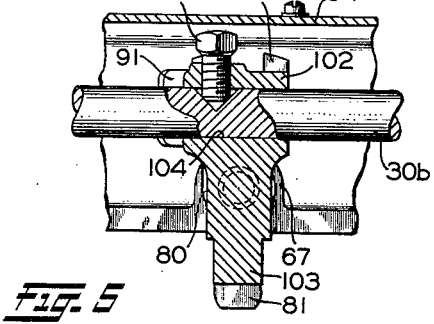

INVENTOR.
Paul E. Olson
BY
*A. A. Steinmiller*
Attorney

United States Patent Office 3,158,070
Patented Nov. 24, 1964

3,158,070
MULTI-POSITION FLUID MOTOR MECHANISM
Paul E. Olson, Pittsburgh, Pa., assignor to Westinghouse Air Brake Company, Wilmerding, Pa., a corporation of Pennsylvania
Filed Mar. 24, 1961, Ser. No. 98,073
7 Claims. (Cl. 92—52)

This invention relates to fluid pressure operated motors and, more particularly, to fluid motors capable of being controlled to positively provide a plurality of different fixed positions of one or more actuating rods employed for any desired function or purpose.

The term "fluid motor" refers to one or more cylinders each provided with a double-acting differential type power piston device and a pair of chambers to which chambers fluid under pressure may be supplied and from which fluid under pressure may be released to move the piston device to different positions within a corresponding cylinder to control the operation of, for example, a multi-speed-position power transmission unit.

It is well known that fluid motors have heretofore been used to control the operation of multi-speed-position power transmission units. However, when a large number of gears are used for a number of speeds, then certain practical problems arise in connection with mounting the necessary number of fluid motor cylinders required in connection with the transmission mechanism.

It is an object of this invention to provide a novel design of a fluid motor of simple and compact construction of relatively low cost, and adapted for use in conjunction with a transmission unit having a large number of speed change positions.

The multi-position fluid motor of the present invention comprises essentially a plurality of cylinders (illustratively shown as three in number) arranged in side-by-side parallel relation each cylinder of which contains a double-acting differential type power piston device for actuating, for example, corresponding gear shifting rods respectively to a multiplicity of preselected definite positions responsively to the supply and release of fluid under pressure to and from the cylinders. The double-acting differential type power piston device in each cylinder comprises a cylindrical power piston and one or more concentrically arranged hollow cylindrical pistons slidably mounted within the corresponding cylinder and within which hollow cylindrical piston or pistons the cylindrical power piston operates. The hollow cylindrical pistons are slidably mounted between fixed stops which provide limited axial movement thereof in opposite directions whereby the hollow cylindrical pistons cooperate with the fixed stops to determine a Neutral position for the cylindrical power piston and to limit the amount of movement of the cylindrical power piston from a Neutral position to each of two other definite positions one on either side of the Neutral position. Any suitable type of manually operated control valve device may be used for selectively controlling the supply of fluid under pressure to and the release of fluid under pressure from the cylinders to so operate the double-acting differential type power piston devices so as to effect the required sequence of speed change or gear shifting operation of the transmission unit.

In the accompanying drawings:

FIG. 1 is a diagrammatic plan view, in outline, of a six-position manually operated control valve device together with a novel fluid motor comprising three multi-position cylinders embodying the invention.

FIG. 2 is a horizontal cross-sectional view of the fluid motor of FIG. 1, taken along the line 2—2 of FIG. 3 and looking in the direction of the arrows, showing details of the fluid motor and with the double-acting differential type power piston device of each cylinder shown in its Neutral position.

FIG. 3 is a vertical cross-sectional view of the fluid motor of FIG. 2, taken along the line 3—3 of FIG. 2 and looking in the direction of the arrows, showing the arrangement of three passageways through which fluid under pressure is supplied to three corresponding chambers each located at a corresponding end of one of the three cylinders.

FIG. 4 is a vertical cross-sectional view, taken along the line 4—4 of FIG. 2 and looking in the direction of the arrows, showing structural details of a mechanism through which the movement of the double-acting differential type power piston devices is transmitted to corresponding gear shifting rods of a transmission unit.

FIG. 5 is a vertical cross-sectional view, taken along the line 5—5 of FIG. 4 and looking in the direction of the arrows, showing structural details of how a finger for operating a gear shifting rod is rigidly secured to a piston rod of the center cylinder of the multi-position fluid motor.

Figure 7:
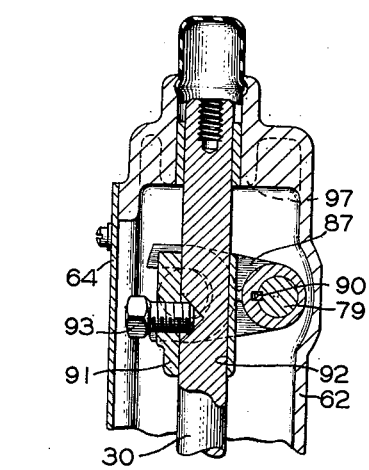

FIG. 7 is a vertical cross-sectional view, taken along the line 7—7 of FIG. 2 and looking in the direction of the arrows, showing structural details of how a collar for operating the mechanism through which movement of the double-acting differential type power piston device of the left-hand cylinder of the multi-position fluid motor, as viewed in FIG. 2, is rigidly secured to the piston rod of this cylinder.

Figure 8:
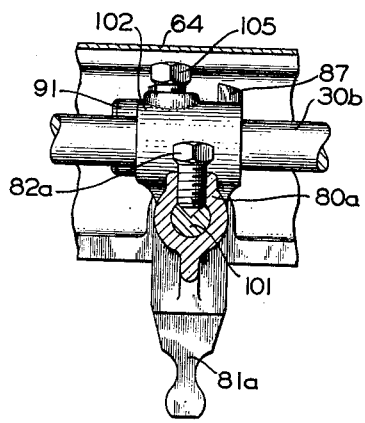

FIG. 8 is a vertical cross-sectional view, taken along the line 8—8 of FIG. 4 and looking in the direction of the arrows, showing structural details of how a finger for operating a second gear shifting rod is rigidly secured to an operating shaft of the mechanism through which movement of the double-acting differential type power piston device of the right-hand cylinder of the multi-position fluid motor, as viewed in FIG. 2, is rigidly secured to the piston rod of this cylinder.

Description

FIG. 1 of the drawings shows a multi-cylinder fluid motor 1, a manually operative control valve device 2 and a reservoir 3 charged with fluid under pressure by a fluid compressor (not shown) for supplying fluid under pressure to the control valve device 2 through a pipe 4.

Figure 6:
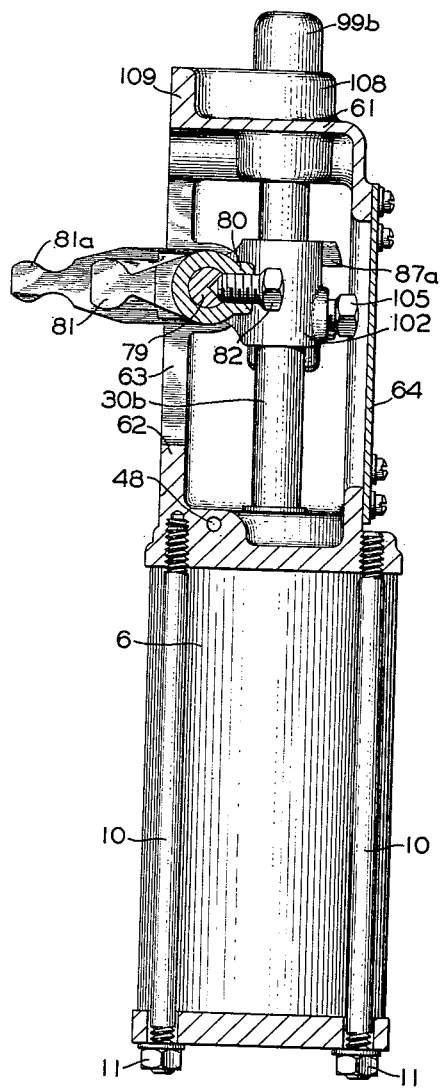
FIG. 6 is a vertical cross-sectional view, taken along the line 6—6 of FIG. 2 and looking in the direction of the arrows, showing structural details of how the cylinders of the fluid motor are secured to a pair of common pressure heads one located at each end thereof by means of studs and nuts.

As shown in FIG. 2 of the drawings, the fluid motor 1 comprises three parallel-arranged cylinders 5, 6 and 7, an end pressure plate 8 and a combined pressure head and shaft bearing housing 9. The cylinders 5, 6 and 7, the end pressure plate 8 and the combined pressure head and shaft bearing housing 9 are secured together by a plurality of studs 10 and nuts 11 two of each being shown in FIG. 6 of the drawings.

As shown in FIGS. 2 and 3, the lower end of the combined pressure head and shaft bearing housing 9 comprises a face into which is machined or formed three spaced-apart annular grooves 12, 13 and 14, the centers of which lie on a horizontal straight line, as shown in FIG. 3. Likewise, the end pressure head 8 has machined or formed on its inside or upper face three spaced-apart annular grooves 15, 16 and 17 (see FIG. 2) which are coaxial with and corresponding respectively in diameter to the respective grooves 12, 13 and 14 in the combined pressure head and shaft bearing housing 9. Disposed in each of the grooves 12, 13, 14, 15, 16 and 17 is a resilient gasket ring 18.

The cylinder 5 comprises a hollow bushing the opposite ends of which are disposed respectively in the grooves 12 and 15 and which are drawn into sealing contact with the respective gaskets 18 in these grooves by the nuts 11 when they are tightened on the studs 10.

The cylinder 5 midway the ends thereof has machined or formed in its interior wall an annular groove 19 into which a snap ring 20 is inserted. The cylinder 5 also has two small drilled bores 21, 22 extending through the wall thereof one located on each side of the groove 19 and each on the left-hand side of the cylinder 5, as viewed in FIG. 2 of the drawings.

Disposed within the cylinder 5 is a piston device which comprises a double-acting cylindrical power piston 23 and two identical and concentric but oppositely arranged hollow cylindrical pistons 24 and 25 having respectively at one end inturned annular flanges 26 and 27. The hollow cylindrical pistons 24 and 25 are respectively slidably mounted within the cylinder 5 on opposite sides of the snap ring 20 which acts as a stop to limit movement of each piston in the direction of the other. The opposite ends of the power piston 23 are respectively slidably disposed within the hollow pistons 24 and 25 between the inturned flanges 26 and 27 the length of the power piston 23 being the same as the distance between the flanges 26 and 27 when the ends of the respective hollow cylindrical pistons 24 and 25 opposite the flanged ends are in contact with the opposite sides of the snap ring 20.

The hollow cylindrical piston 24 and the corresponding end of the power piston 23 cooperate with the wall of the cylinder 5 adjacent the upper end thereof and the face of the combined pressure head and shaft bearing housing 9 to form a first pressure chamber 28 at the upper end of the cylinder 5 while the hollow cylindrical piston 25 and the corresponding end of the power piston 23 cooperate with the wall of cylinder 5 and the upper or inside face of the end pressure plate 8 to form a second pressure chamber 29 at the lower end of the cylinder 5.

The double-acting power piston 23 has one end of a piston rod 30 secured thereto, as by means of a nut 31. The piston rod 30 projects through a bore 32 in a bushing 33 press-fitted into a bore 34 extending through a wall 35 of the combined pressure head and shaft bearing housing 9 and extends into a chamber 36 formed within the housing.

The cylinders 5 and 7 and the piston devices disposed therein are generally similar except the inside and outside diameters of the cylinder 7 are greater than those of the cylinder 5 and the diameters of the corresponding components of the piston device in the cylinder 7 are correspondingly greater. Corresponding parts of the cylinder 7 and the piston device mounted therein will be identified by the same reference numerals with a suffix letter $a$.

The cylinder 6 comprises a hollow bushing having a counterbore 37 extending from its lower end to a point midway the length of the bushing. The cylinder 6 also has two diametrically opposite small drilled bores 38 and 39 extending through the wall thereof, the axes of these bores being in the plane of the shoulder formed at the upper end of the counterbore 37.

Disposed within the cylinder 6 is a piston device which comprises a double-acting differential type cylindrical power piston member 40 and a hollow cylindrical piston 41. As seen in FIG. 2, the double-acting differential type cylindrical power piston member 40 includes a larger piston 42 at its upper end slidably mounted within the cylinder 6 and a smaller piston 43 at its lower end slidably mounted within the hollow cylindrical piston 41, which in turn is slidably mounted within the counterbore 37 in the cylinder 6. The double-acting differential type cylindrical power piston member 40 has an external annular flange 44 which is located upwardly from the outer face of the smaller piston 43 a distance equal to the length of the hollow cylindrical piston 41. The purpose of the flange 44 is to limit downward movement of the double-acting differential type cylindrical power piston member 40 when the larger piston 42, the smaller piston 43 and the hollow cylindrical piston 41 are all simultaneously subject to fluid at the same pressure.

The larger piston 42 cooperates with the wall of the cylinder 6 adjacent the upper end thereof and the face of the combined pressure head and shaft bearing housing 9 to form a third pressure chamber 45 at the upper end of the cylinder 6. At the lower end of the cylinder 6 the wall thereof and the upper or inside face of the end pressure plate 8 cooperates with the lower ends of the hollow cylindrical piston 41 and the smaller piston 43 to form a fourth pressure chamber 46.

The larger piston 42 of the double-acting differential type cylindrical power piston member 40 has one end of a piston rod 30$b$ secured thereto, as by means of a nut 31$b$. The piston rod 30$b$ projects through a bore 32$b$ in a bushing 33$b$ press-fitted into a bore 34$b$ extending through a wall 35$b$ of the combined pressure head and shaft bearing housing 9 and extends into the chamber 36.

As can best be seen in FIG. 3, adjacent its lower end, the combined pressure head and shaft bearing housing 9 is provided with three passageways 47, 48 and 49 which at one end open respectively to the chambers 28, 45 and 28$a$ and which at their opposite ends terminate in corresponding screw-threaded openings 50, 51 and 52 extending to the exterior of the housing 9, which openings are each adapted to receive one threaded end of a pipe.

As shown in FIG. 2, the end pressure plate 8 is provided with three screw-threaded openings 53, 54 and 55 which extend through the plate 8 and open respectively into the chambers 29, 46 and 29$a$.

In order to prevent leakage of fluid under pressure past the hollow cylindrical pistons 24, 24$a$, 25, 25$a$ and 41, the larger piston 42, the smaller piston 43 and each end of the power pistons 23 and 23$a$, each of these hollow cylindrical pistons and each end of the two power pistons is provided with a resilient gasket ring 56 having sealing and sliding contact with the wall of the respective bore in which it operates.

Leakage from the chambers 28, 28$a$ and 45 along the respective piston rods 30, 30$a$ and 30$b$ which extend through the respective bores 32, 32$a$ and 32$b$ in the corresponding bushings 33, 33$a$ and 33$b$ into the chamber 36 is prevented by a first resilient gasket ring 57 disposed in surrounding relation to each of the piston rods and within an annular groove in the corresponding bushing. A second resilient gasket ring 58 is disposed in surrounding relation to the reduced portion of each of the piston rods and within an annular groove formed in the respective power pistons and serves to prevent leakage from the respective chambers 28, 28$a$ and 45 along the reduced portions of the piston rods 30, 30$a$ and 30$b$ to the corresponding chambers 29, 29$a$ and 46 and vice versa.

The combined pressure head and shaft bearing housing 9 has two outer spaced-apart parallel upstanding walls 59 and 60 arranged respectively to the left and to the right of the piston rods 30 and 30$a$. The outer walls 59 and 60 are cast integral with the walls 35, 35$a$, and 35$b$ which constitute the lower end of the housing 9, as viewed in FIG. 2, an upper wall 61 and a bottom wall 62 (FIG. 4) having a slot 63 therein. These walls cooperate with a removable cover plate 64 to form the chamber 36 into which the piston rods 30, 30$a$ and 30$b$ extend in spaced-apart parallel relation.

The two opposite parallel walls 59 and 60 of the combined pressure head and shaft bearing housing 9, as shown in FIGS. 2 and 4, respectively, have inward facing bosses 65 and 66. Extending upward from and formed integral with the bottom wall 62 are two upstanding and spaced-apart bosses 67 and 68 which are coaxial with and parallel to the inward facing bosses 65 and 66. The bosses 65, 66, 67 and 68 are provided respectively with coaxial bores 69, 70, 71 and 72 all of the same diameter. The bores 69, 70, 71 and 72 contain, respectively, bushings 73, 74, 75 and 76. The bushings 74 and 75 are retained in the respective bosses 67 and 68 by means of pins 77 and 78, respectively.

Rotatably mounted in the bushings 73 and 74 is a first shaft 79 the ends of which extend in opposite directions beyond the remote ends of these bushings. The portion of the shaft 79 that extends through and beyond the bushing 74 has mounted thereon a hub portion 80 of a first finger 81 that extends through the slot 63 in bottom wall 62 for actuating, for example, a corresponding gear shifting rod (not shown). The hub portion 80 of the finger 81 is locked to the shaft 79 by a set screw 82, the end of which extends into a recess 83 formed in the shaft 79 adjacent the right-hand end thereof. The portion of the shaft 79 that extends through and beyond the bushing 73 is screw-threaded to receive a washer 84 which is forced against a collar 85 formed on the exterior end of the bushing 73 by a nut 86.

Disposed between the bosses 65 and 67 is a first double yoke 87 which has a bore 88 through which the shaft 79 extends. The shaft 79 and the double yoke 87 are provided with corresponding keyways in which is received a key 90 that locks the double yoke 87 to the shaft 79 for rocking therewith.

Disposed between the jaws of the double yoke 87 is a collar 91 having a bore 92 through which the piston rod 30 extends. The collar 91 is locked to the piston rod 30 by a set screw 93 (see FIG. 2). The piston rod 30 extends beyond the collar 91 and slidably through a bore 94 in a bushing 95 that is press-fitted into a bore 96 formed in a first boss 97 extending into the chamber 36 from the upper wall 61. A second boss 98 coaxial with the first boss 97 and extending in the opposite direction from the upper wall 61 is provided with a bore coaxial and coextensive with the bore 96 for receiving a cup-shaped cap member 99 which is provided adjacent its open end with an exterior annular rib 100 which fits into a corresponding groove in the second boss 98. The purpose of the cup-shaped cap member 99 is to protect the end of the piston rod 30 from dirt, ice and water. Cap member 99 may be fabricated from resilient material, such as thin spring steel, and then provided with one or more longitudinal slots (not shown) in the periphery thereof adjacent its open end in order that the rib 100 can be snapped into its corresponding groove and also pulled therefrom with comparative ease.

The mounting of the first shaft 79 in the bushings 73 and 74 and a second shaft 101 in the bushings 75 and 76 is generally similar. Corresponding parts for mounting the second shaft 101 and also the parts mounted thereon will be identified by the same reference numeral with the suffix letter *a* without additional description.

A hub portion 102 of a third gear shifting rod operating finger 103 somewhat different in design from the fingers 81 and 81*a* is provided with a bore 104 through which the piston rod 30*b* extends. The hub portion 102 of the finger 103 is locked to the piston rod 30*b* by a set screw 105 (see FIG. 2). The piston rod 30*b* extends beyond the hub portion 102 and has its outer end slidably mounted in a structure generally similar to that in which the outer ends of the piston rods 30 and 30*a* are mounted. Corresponding parts of this end mounting structure will be identified by the same reference numeral with the suffix letter *b* without additional description.

As illustrated in FIG. 7, the outer ends of the piston rods 30, 30*a* and 30*b* are provided with a screw-threaded counterbore for receiving the threaded end of a pull rod whereby subsequent to removal of the cap members and the nuts on the end of the piston rods and loosening of the cap screws from the hub portion and collars mounted on the piston rods, these rods can be pulled upward, as viewed in FIG. 2, to remove them from within the chamber 36. Also, such a pull rod can be used in the same manner to insert the piston rods into and through the chamber 36 when assembling the multi-cylinder fluid motor.

In order to permit securing the multi-cylinder fluid motor 1 to a transmission unit in place of a manual gear shift transmission cover, the upper wall 61 has formed integral therewith three spaced-apart bosses 106, 107 and 108. The bosses 106 and 107 are formed on the lower side of upper wall 61 and extend outward, as viewed in FIG. 2, from the bottom wall 62 while the third boss 108 is formed on the upper side of upper wall 61 and extends outward from a flange 109 that is formed integral with the wall 61 and projects upward therefrom. Each of the bosses 106, 107 and 108 is provided with corresponding bores 110, 111 and 112 and the bottom wall 62 is provided with three spaced-apart bores 113, 114 and 115, the bore 113 being disposed on the left-hand side of the piston rod 30*b* and the bores 114 and 115 being disposed on the right-hand side of this rod, as viewed in FIG. 2. Suitable cap screws (not shown) can be inserted through the six bores 110, 111, 112, 113, 114 and 115 and screw-threaded into corresponding screw-threaded bores in the housing (not shown) of a transmission unit to secure the multi-cylinder fluid motor 1 to the transmission unit housing.

The manually operative control valve device 2 shown in FIG. 1 may be the same as the manually operative control valve device shown and described in Patent No. 3,031,853 issued May 1, 1962, to Paul E. Olson, and assigned to the assignee of the present application, and reference thereto may be had for a detailed description of the structure and operation thereof.

Briefly, however, the manually operative control valve device 2 comprises a casing 116 having a cylindrical bore (not shown) therein providing a sealed chamber to which fluid under pressure may be constantly supplied from the reservoir 3 via the pipe 4 and from which fluid under pressure may flow through a plurality of ports opening at the surface of the bore and arranged in pairs in parallel spaced-apart planes at right angles to the axis of the bore. Each pair of ports is arranged in the same angularly spaced relation and each port is connected via a separate passageway in the casing 116 to a corresponding screw-threaded port opening at the face of a pipe bracket 117. A rotary valve member (not shown) disposed within the bore is rotatably mounted in the casing 116 and has an operating shaft that is coaxial to the bore and extends exteriorly of the casing for attachment to an operating handle 118 whereby rotary movement of the valve member within the bore may be effected. The rotary valve member has an atmospheric exhaust passageway extending therethrough opening at one end to atmosphere and at the other end at the peripheral surface of the valve member. By means of the operating handle 118 that end of the exhaust passageway in the rotary valve member that opens at the peripheral surface thereof may be moved into sealed alinement with any one of the ports opening at the surface of the bore in the casing to establish a communication between the corresponding passageway and atmosphere.

As shown in FIG. 1 of the drawings, the face of the pipe bracket 117 is provided with seven ports 119, 120, 121, 122, 123, 124 and 125 each of which is screw-threaded to receive the threaded end of a pipe. The end of the pipe 4 leading from the reservoir 3 is connected to the port 119. The ports 120 and 121 are connected, respectively, by pipes bearing the same numerals to the screw-threaded opening 53 (FIG. 2) in the end pressure plate 8 and the screw-threaded opening 50 (FIG. 3) in the combined pressure head and shaft bearing housing 9 and, hence, to the respective chambers 29 and 28 in the cylinder 5. The ports 122 and 123 are connected, respectively, by pipes bearing the same numerals to the screw-threaded opening 54 (FIG. 2) in the end pressure plate 8 and the screw-threaded opening 51 (FIG. 3) in the combined pressure head and shaft bearing housing 9 and, hence, to the respective chambers 46 and 45 in the cylinder 6. Likewise, the ports 124 and 125 are connected, respectively, by pipes bearing the same numerals to the screw-threaded opening 55 (FIG. 2) in the end pressure plate 8 and the screw-threaded opening 52 (FIG. 3) in the combined pressure head and shaft bearing housing 9 and, hence, to the respective chambers 29a and 28a in the cylinder 7.

Disposed in the respective pipes 120, 121, 122, 123, 124 and 125 are check valves 120a, 121a, 122a, 123a, 124a and 125a and adjustable needle valve devices or chokes 120b, 121b, 122b, 123b, 124b and 125b connected, respectively, in by-passing relation to these check valves to permit a rapid flow of fluid under pressure to the respective chambers 29, 28, 45, 46, 29a and 28a and a restricted flow of fluid under pressure therefrom at any desired rate.

As explained in detail in the above-mentioned Patent No. 3,031,853, the casing 116 of the manually operative control valve device 2, as shown in FIG. 1, has formed integral therewith two generally alike guide members 126 and 127 which extend therefrom in spaced-apart parallel relation.

Provided in each of the guide members 126 and 127, as by machining, are three spaced-apart parallel slots 128, 129 and 130. The width of each slot in each guide member is slightly in excess of the width of each arm of a cruciform portion (not shown) of the operating handle 118 to provide a sliding fit therebetween.

The three slots in each guide member cooperate to form on the respective guide member two spaced-apart parallel fingers 131 and 132 projecting in the direction opposite the direction of projection of the corresponding fingers on the other guide member and spaced therefrom a distance great enough to form a longitudinal path through which the handle 118 may be moved between the two guide members 126 and 127. Each slot in each pair of corresponding slots in the guide members 126 and 127 thus form an opening for receiving one or the other of two arms (not shown) on the cruciform portion of the handle 118, as explained in the above-mentioned Patent No. 3,031,853, accordingly, as the handle 118 is rocked in one direction or in an opposite direction to one or the other of its two extreme positions.

As explained in detail in the above-mentioned Patent No. 3,031,853, in order to rock the handle 118 in one direction to a position in which one of the two arms (not shown) on the cruciform portion of the handle will be received in either the slot 128 or 130 in the guide member 126, the handle 118 must first be moved in its longitudinal path in one direction or in an opposite direction against the yielding resistance of a caged spring (not shown) to a position in this longitudinal path in which the above-mentioned one arm of the cruciform portion of the handle will be received respectively in either the slot 128 or the slot 130 in the guide member 126 when the handle 118 is rocked in the above-mentioned one direction. It is also apparent that in order to rock the handle 118 in an opposite direction to a position in which the other of the two arms on the cruciform portion of the handle will be received in either the slot 128 or the slot 130 in the guide member 127, the handle 118 must first be moved in its longitudinal path in one direction or in an opposite direction against the yielding resistance of the caged spring to a position in this longitudinal path in which the above-mentioned other arm of the cruciform portion will be received in either the slot 128 or the slot 130 in the guide member 127 when the handle is rocked in the above-mentioned opposite direction.

Since the handle 118 is connected to the rotary valve member of the manually operative control valve device 2, the rotary valve member can be rotated within the bore in the casing 116 by rocking the operating handle 118 from one or another of three spaced-apart Neutral positions N1, N2 and N3, which three Neutral positions are in the above-mentioned longitudinal path. In each of these Neutral positions fluid under pressure is supplied from the reservoir 3 through pipe 4 and the corresponding passageway in the casing 116 to all of the other ports and passageways in the casing and thence through the corresponding pipes to all of the chambers in the cylinders 5, 6 and 7. The operation handle 118 can be rocked in the above-mentioned one direction from each of its three Neutral positions N1, N2 and N3 to a corresponding one of three positions C1, C2 and C3 or the handle can be rocked in the above-mentioned opposite direction to a corresponding one of three other positions CC1, CC2 and CC3, as indicated in FIG. 1 by the legends C1, C2, C3, CC1, CC2 and CC3. Thus, rocking the handle 118 to these different positions controls the supply of fluid under pressure from the reservoir 3 through pipe 4 and certain ports and passageways in the control valve casing 116 and pipe bracket 117 and corresponding pipes to certain of the chambers in the cylinders 5, 6 and 7 and also the release of fluid under pressure from one of the chambers in these cylinders to atmosphere to control the operation of the power piston of this one of the cylinders whereby the piston rod connected to this power piston may be shifted from a corresponding Neutral position to a corresponding control position, respectively.

*Operation*

The multi-cylinder fluid motor 1 comprising the three parallel arranged cylinders 5, 6 and 7 may be used to control the operation of, for example, a transmission unit having a reverse drive position or speed and five forward drive positions or speeds, the gears to be meshed for the second, third, fourth and fifth forward drive speeds being brought approximately to the correct speed just before meshing by a "synchromesh" device. When the multi-cylinder fluid motor 1 is used to control the operation of a transmission unit of the above-mentioned type, the cylinder 7 is used to control the operation of a first gear shifting rod (not shown) that effects meshing of the proper gears for the reverse and first forward drive speeds which gears are not of the "synchromesh" type, the cylinder 6 is used to control the operation of a second gear shifting rod (not shown) that effects meshing of the proper gears for the second and third forward drive speeds which gears are of the "synchromesh" type, and the cylinder 5 is used to control the operation of a third gear shifting rod (not shown) that effects meshing of the proper gears for the fourth and fifth forward drive speeds which gears are also of the "synchromesh" type.

In operation, let it be assumed that the reservoir 3 is charged with fluid to some chosen pressure, such as one hundred pounds per square inch. Further, assume that the handle 118 and the rotary valve member of the manually operative control valve device 2 occupy their First Neutral position N1 in which the handle is shown in FIG. 1. While in its First Neutral position N1, as shown in FIG. 1, the handle 118 is disposed in a position midway the length of its longitudinal path. As long as the handle 118 is in any position in its longitudinal path, the rotary valve member of the control valve device 2 occupies a corresponding position in which it is out of alignment with all of the ports opening at the surface of the cylindrical bore within the casing 116 in which the rotary valve member is rotatably mounted. Consequently, fluid under pressure supplied from the reservoir 3 through pipe 4 and the supply passageway in the casing 116 to the interior of the cylindrical bore will flow therefrom through each and all of the other ports and passageways in the casing and corresponding pipes to the chambers 28 and 29, 45 and 46, and 28a and 29a in the corresponding cylinders 5, 6 and 7.

The fluid under pressure thus supplied to the chamber 28 in the cylinder 5 through the port and passageway and corresponding pipe 121 will act on the effective area of the hollow piston 24 and also flow through the opening within flange 26 to act on the effective area of the upper face or piston rod side of the double-acting power piston 23.

The fluid under pressure supplied to the chamber 29 in the cylinder 5 through the port and passageway and corresponding pipe 120 will act on the effective area of the hollow piston 25 and also flow through the opening within the flange 27 to act on the entire area of the lower face of the double-acting power piston 23. Since the fluid acting on the upper face of the power piston 23 is at the same pressure as that supplied to the lower face and the area of the upper face is less than the area of the lower face by an amount equal to the cross-sectional area of the piston rod 30, a differential pressure force is established on the opposite faces of the power piston 23 to move the power piston in an upward direction, as viewed in FIG. 2. However, the effective area of the hollow piston 24 is such that the fluid pressure force established on the upper side of the hollow piston 24 and effective to move this hollow piston in a downward direction, as viewed in FIG. 2, is greater than the differential pressure force acting on the power piston 23 to move it in an upward direction. Consequently, the fluid pressure acting the chamber 28 and on the upper side of the hollow piston 24 is effective to move the hollow piston 24 and, by means of the inturned flange 26, the power piston 23 to a Neutral position in which they are shown in FIG. 2 in which Neutral position the lower end of the hollow piston 24 abuts the upper side of the snap ring 20 which acts as a stop to prevent further downward movement.

The fluid under pressure in the chamber 29 that acts on the effective area of the hollow piston 25 moves this hollow piston upward to the position in which it is shown in FIG. 2 in which position the upper end thereof abuts the lower side of the snap ring 20 which acts at a stop to prevent further upward movement.

It may be noted that as the hollow pistons 24 and 25 and the double-acting power piston 23 are moved to the position in which they are shown in FIG. 2, the annular chamber between these two hollow pistons and the power piston 23 is open to atmosphere through the bores 21 and 22 in the wall of the cylinder 5 on each side of the snap ring 20. Consequently, there can be no compression of fluid under pressure in this annular chamber.

The fluid under pressure supplied to the chambers 28a and 29a in the cylinder 7 through the ports and passageways and corresponding pipes 125 and 124 will effect movement of the hollow pistons 24a and 25a and the double-acting power piston 23a to the position in which they are shown in FIG. 3 in the same manner as hereinbefore described for the hollow pistons 24 and 25 and double-acting power piston 23 of the cylinder 5.

The fluid under pressure supplied to the chamber 45 in the cylinder 6 through the port and passageway and corresponding pipe 123 and the fluid under pressure supplied to the chamber 46 in the cylinder 6 through the port and passageway and corresponding pipe 122 acts, respectively, on the effective area of the larger piston 42 and the entire area of the smaller piston 43 to establish a differential pressure force on the differential power piston member 40 which is effective to move this piston member in a downward direction, as viewed in FIG. 2. At the same time, the fluid under pressure present in the chamber 46 acts on the effective area of the hollow piston 41 to establish a fluid pressure force to move the hollow piston 41 upward, as viewed in FIG. 2. The effective area of the hollow piston 41 is such that the fluid pressure force established thereon by the fluid under pressure present in the chamber 46 is greater than the differential fluid pressure force acting on the differential power piston member 40 to move this power piston member downward. Consequently, the difference in these two opposing fluid pressure forces is effective to move the hollow piston 41 and, by means of the out-turned flange 44, the differential power piston member 40 to a Neutral position in which they are shown in FIG. 2 in which Neutral position the upper end of the hollow piston 41 abuts the shoulder formed by the upper end of the counter bore 37 and the external flange 44 on the differential power piston member 40 abuts the upper end of the hollow piston 41, the shoulder and the upper end of the hollow piston 41 acting respectively as stops to prevent further upward movement of the hollow piston 41 and downward movement of the differential power piston member 40.

With the handle 118 and the rotary valve member of the manually operative control valve device 2 occupying their First Neutral position N1, as hereinbefore explained, let it be supposed that an operator desires to effect actuation of, for example, the first gear shifting rod of the transmission unit from its Neutral position to its First Forward Drive position.

As hereinbefore explained, when the handle 118 is in its First Neutral position N1 (FIG. 1), it is in a position to be moved in either a right-hand or a left-hand direction in its longitudinal path. Hence, in order to effect positioning of the piston rod 30a of the cylinder 7, the operator will now move the handle 118 in its longitudinal path in the direction of the right hand, as viewed in FIG. 1, and, consequently, the rotary valve element in the same direction within the bore in the casing 116 against the yielding resistance of the caged spring, out of its First Neutral position N1 to its Third Neutral position N3 in which the hereinbefore-mentioned arms of the cruciform portion of the handle 118 can be received respectively, in the slot 130 in the handle guide member 126 or in the slot 130 in the handle guide member 127 accordingly as the handle 118 is rocked in the hereinbefore-mentioned one direction to its position C3 or in the hereinbefore-mentioned opposite direction to its position CC3.

Since the operator desires to effect actuation of the first gear shifting rod of the transmission unit from its Neutral position to its First Forward Drive position, he will, without releasing his grip on the handle 118, and without delay, rock the handle 118 in the hereinbefore-mentioned one direction out of its Third Neutral position N3 to its position C3 (FIG. 1) in which position the hereinbefore-mentioned one arm of the cruciform portion of the handle 118 contacts the end of the slot 130 in the handle guide member 126 (FIG. 1). In rocking the handle 118 out of its Third Neutral position N3 to its position C3 (FIG. 1), the rotary valve element is rotated within the bore in the casing 116 to a position in which the pipe 124 and the corresponding port and passageway in the casing 116 are connected to atmosphere, as explained in the herebefore-mentioned Patent No. 3,031,853, thus venting the chamber 29a in the cylinder 7 while all of the other pipes, passageways, and corresponding ports opening at the surface of the bore remain charged with fluid under pressure from the reservoir 3.

As fluid under pressure is thus vented from the chamber 29a in the cylinder 7, as just explained, and at a rate in accordance with the setting or adjustment of the needle valve device 124b, the fluid under pressure supplied to the chamber 28a in this cylinder moves the power piston 23a and the piston rod 30a connected thereto within this cylinder downward until the lower face of the hollow piston 25a, which is carried downward by the power piston 23a contacting flange 27a on the hollow piston 25a, contacts the upper face of end pressure plate 8. It may be noted that the lower end of the hollow piston 24a is held in contact with the upper side of the snap ring 20a by the fluid under pressure present in the chamber 28a and does not move from the position shown in FIG. 2. As the power piston 23a is thus moved downward from the position in which it is shown in FIG. 2 to the position in which the lower face of the hollow piston 25a contacts the upper face of the end pressure plate 8, the piston rod 30a connected at one end to the power piston 23a will be shifted from its Neutral position N to a second position which, for example, may be a First Forward Drive position P1.

As the piston rod 30a is thus shifted from one position to another position, the collar 91a (FIG. 4), secured to the piston rod 30a by the set screw 93a (FIG. 2), is effective, through the double yoke 87a which is keyed to the shaft 101 by key 90a (FIG. 4), to rock the shaft 101 and the finger 81a (FIG. 8), secured to this shaft by set screw 82a, in a counterclockwise direction, as viewed in FIG. 8, to correspondingly actuate the above-mentioned first gear shifting rod of the transmission unit from its Neutral position to its First Forward Drive position to bring into mesh the proper "non-synchromesh" gears of the transmission unit to obtain the first forward drive speed of the transmission unit.

Let it be now supposed that the operator desires to operate the transmission unit to change from the first forward drive speed to the second forward drive speed, it being assumed that the engine load condition is favorable for such a change of speed. To do so, the operator will first rock the handle 118 in the hereinbefore-mentioned opposite direction out of its position C3 (FIG. 1) back to its Third Neutral position N3 in its longitudinal path. Subsequent to rocking the handle 118 to its Third Neutral position N3, the operator allows the caged spring to move the handle in its longitudinal path out of its Third Neutral position N3 in the direction of the left hand to its First Neutral position N1. As the handle 118 is thus returned to its First Neutral position N1, the rotary valve member within the bore in the casing 116 of the control valve device 2 is returned to a corresponding position. Consequently, fluid under pressure will again be supplied through the port and corresponding passageway to which the pipe 124 is connected and thence unrestricted through this pipe and check valve device 124a to the previously vented chamber 29a in the cylinder 7, it being understood that all of the other ports, passageways, and pipes remain charged with fluid under pressure as previously explained.

Upon the resupply of fluid under pressure to the chamber 29a in the cylinder 7, this fluid under pressure acts on the lower faces of the power piston 23a and the the hollow piston 25a. The fluid under pressure acting in the chamber 29a on the entire lower face of the power piston 23a establishes a force acting in an upward direction that exceeds the force established by the fluid under pressure in the chamber 28a acting on the upper face of the power piston 23a, since the effective area of the lower face of the power piston 23a exceeds the effective area of the upper face of the power piston 23a by the cross-sectional area of piston rod 30a. Therefore, the difference in these forces together with the force established by the fluid under pressure acting on the lower face of the hollow piston 25a is effective to move the hollow piston 25a and the power piston 23a upward until the upper end of the hollow piston 25a contacts the lower side of the snap ring 20a in which position the power piston 23a and hollow piston 25a are shown in FIG. 2. Further upward movement of the power piston 23a is prevented since the force established by the pressure in chamber 28a acting downward on the effective area of the hollow piston 24a exceeds the differential pressure force acting upward on the power piston 23a. As hollow piston 25a is thus moved upward, the fluid at atmospheric pressure in the annular chamber above the hollow piston 25a is vented to atmosphere through the bores 21a and 22a in the cylinder 7 and on opposite sides of snap ring 20a. As the power piston 23a is thus returned to the position in which it is shown in FIG. 2, the piston rod 30a connected thereto will be shifted from its above-mentioned First Forward Drive position P1 back to its Neutral position N.

As the piston rod 30a is thus shifted from its First Forward Drive position P1 back to its Neutral position N, the collar 91a is effective, through the double yoke 87a, to rock the shaft 101 and finger 81a (FIG. 8) in a clockwise direction, as viewed in FIG. 8, to correspondingly actuate the above-mentioned first gear shifting rod of the transmission unit from its First Forward Drive position back to its Neutral position to move out of mesh the "non-synchromesh" gears of the transmission unit that had been moved into mesh to obtain the first forward drive speed of the transmission unit.

By the time the handle 118 has been moved out of its Third Neutral position N3 back to its First Neutral position N1 by the caged spring, the piston rod 30a will have been returned by the power piston 23a to its Neutral position N. Therefore, upon the handle 118 reaching its First Neutral position N1, the operator will, without delay, rock the handle 118 in the hereinbefore-mentioned one direction out of its First Neutral position N1 to its position C1 (FIG. 1) in which position the hereinbefore-mentioned one arm of the cruciform portion of the handle 118 contacts the end of the slot 129 in the handle guide member 126 (FIG. 1). In rocking the handle 118 out of its First Neutral position N1 to its position C1, the rotary valve element is rotated within the bore in the casing 116 to a position in which the pipe 122 and the corresponding port and passageway in the casing 116 are connected to atmosphere, as explained in the hereinbeforementioned Patent No. 3,031,853, thus venting the chamber 46 in the cylinder 6 while all of the other pipes, passageways and corresponding ports opening at the surface of the bore in the casing 116 of the control valve device 2 remain charged with fluid under pressure from the reservoir 3, as previously explained.

As fluid under pressure is thus vented from the chamber 46 in the cylinder 6, as just explained, and at a rate in accordance with the setting or adjustment of the needle valve device 122b, the fluid under pressure supplied to the chamber 45 in this cylinder moves the differential power piston member 40 and the piston rod 30b connected thereto downward within the cylinder 6 at a desired rate until the lower faces of the smaller piston 43 of the differential power piston member 40 and the hollow piston 41 contact the upper face of end pressure plate 8. As the differential power piston member 40 is thus moved downward from the position in which it is shown in FIG. 2, the flange 44 is effective to move the hollow piston 41 downward with the differential power piston 40. As the differential power piston 40 and the hollow piston 41 move downward, the fluid at atmospheric pressure in the annular chamber above the hollow piston 41 and between the differential power piston 40 and the wall of the cylinder 6 is vented to atmosphere through the bores 38 and 39 in the wall of the cylinder 6. Therefore, the differential power piston 40 is not impeded as it is thus moved from the position in which it is shown in FIG. 2 downward to the position in which the lower faces of the smaller piston 43 and the hollow piston 41 contact the upper face of end pressure plate 8, and the piston rod 30b will be shifted from one position, such as a Neutral position N, to another position, for example, such as a Second Forward Drive position P2.

As the piston rod 30b is thus shifted from one position to another position, the operating finger 103, secured thereto by the set screw 105, is effective to correspondingly actuate the second gear shifting rod of the transmission unit from its Neutral position to its Second Forward Drive position to bring into mesh the proper "synchromesh" gears of the transmission unit to obtain the second forward drive speed of the transmission unit.

Let it now be assumed that the operator desires to operate the transmission unit to change from the second forward drive speed to the third forward drive speed, it being assumed that the engine load condition is favorable for such a change of speed. To effect this speed change, the operator will rock the handle 118 in the hereinbefore-mentioned opposite direction out of its position C1 (FIG. 1) back to its First Neutral position N1. As the handle 118 is thus rocked back to its First Neutral position N1, the rotary valve member within the bore in the casing 116 is rotated back to a corresponding position. Consequently, fluid under pressure will be again supplied through the port and corresponding passageway to which the pipe 122 is connected and thence through this pipe and the check valve device 122a to the previously vented chamber 46 in the cylinder 6, it being understood that all of the other ports, passageways, and pipes remain charged with fluid under pressure, as previously explained.

Upon the resupply of fluid under pressure to the chamber 46 in the cylinder 6, this fluid under pressure acts on the lower faces of smaller piston 43 of the differential power piston member 40 and hollow piston 41. Since the effective area of larger piston 42 is less than the combined areas of the smaller piston 43 and the hollow piston 41 and the same pressure is now present in chambers 45 and 46, the differential power piston member 40 and hollow piston 41 will move upward until the upper end of hollow piston 41 contacts the shoulder at the upper end of counterbore 37. Flange 44 is held against the upper end of hollow piston 41, as shown in FIG. 2, by the pressure in chamber 45 acting on the effective area of larger piston 42. As the differential power piston member 40 is thus returned to the position in which it is shown in FIG. 2, the piston rod 30b connected thereto will be shifted from its above-mentioned Second Forward Drive position P2 back to its Neutral position N.

As the piston rod 30b is thus shifted from its Second Forward Drive position P2 back to its Neutral position N, the operating finger 103 is effective to correspondingly actuate the second gear shifting rod of the transmission unit from its Second Forward Drive position back to its Neutral position to move out of mesh the "synchromesh" gears of the transmission unit that had been moved into mesh to obtain the second forward drive speed of the transmission unit.

Subsequent to movement of the handle 118 from its position C1 to its First Neutral position N1, the operator will, without hesitation, continue to rock the handle 118 in the hereinbefore-mentioned opposite direction from its First Neutral position N1 to its position CC1 (see FIG. 1) in which position the hereinbefore-mentioned other arm of the cruciform portion of the handle 118 contacts the end of the slot 129 in the handle guide member 127 (FIG. 1). In rocking the handle 118 from its First Neutral position N1 in which position it is shown in FIG. 1 to its position CC1, the rotary valve element is rotated within the bore in the casing 116 to a position in which the pipe 123 and the corresponding port and passageway in the casing 116 are connected to atmosphere, as explained in the hereinbefore-mentioned Patent No. 3,031,-853, thus venting the chamber 45 in the cylinder 6 while all of the other pipes, passageways and corresponding ports opening at the surface of the bore remain charged with fluid under pressure from the reservoir 3.

As fluid under pressure is thus vented from the chamber 45 in the cylinder 6, as just explained, and at a rate in accordance with the setting or adjustment of the needle valve device 123b, the fluid under pressure supplied to the chamber 46 in this cylinder continues movement of the differential power piston 40 and the piston rod 30b connected thereto within this cylinder upward until the upper face of the larger piston 42 contacts the wall 35b. It may be noted that the upper end of hollow piston 41 is held in contact with the shoulder at the upper end of counterbore 37 by the fluid under pressure present in chamber 46 and does not move from the position shown in FIG. 2. As the differential power piston 40 is thus moved from the position in which its lower face contacts the upper face of end pressure plate 8 through the position in which it is shown in FIG. 2 to the position in which the upper face of the larger piston 42 contacts the wall 35b, the piston rod 30b connected at one end to the differential power piston 40 will be shifted from its Second Forward Drive position P2 through its above-mentioned Neutral position N to another position, for example, such as a Third Forward Drive position P3.

As the piston rod 30b is thus shifted from one position to another position, the operating finger 103 is effective to correspondingly continuously actuate the above-mentioned second gear shifting rod of the transmission unit through its Neutral position to its Third Forward Drive position to bring into mesh the proper "synchromesh gears" of the transmission unit to obtain the third forward drive speed of the transmission unit.

Let it be assumed that the operator desires to operate the transmission unit to change from the third forward drive speed to the fourth forward drive speed, it being understood that the engine load condition is favorable for such a change of speed.

To do so, the operator will now rock the handle 118 in the hereinbefore-mentioned one direction out of its position CC1 back to its First Neutral position N1. As the handle 118 is thus rocked back to its First Neutral position N1, the rotary valve member within the bore in the casing 116 is rotated back to a corresponding position. Consequently, fluid under pressure will be again supplied through the port and corresponding passageway to which the pipe 123 is connected and thence through this pipe to the previously vented chamber 45 in the cylinder 6, it being understood that all of the other ports, passageways, and pipes remain charged with fluid under pressure as previously explained.

Upon the resupply of fluid under pressure to the chamber 45 in the cylinder 6, this fluid under pressure acts on the upper face of the larger piston 42 of the differential power piston 40. Since the effective area of the larger piston 42 is greater than the effective area of the smaller piston 43 but less than the combined effective areas of the smaller piston 43 and the hollow piston 41, and the same pressure is now present in chambers 45 and 46, the differential power piston 40 will move downward until the flange 44 contacts the upper end of hollow piston 41. As the differential power piston member 40 is thus returned to the position in which it is shown in FIG. 2, the piston rod 30b connected thereto will be shifted from its above-mentioned Third Forward Drive position P3 back to its Neutral position N.

As the piston rod 30b is thus shifted from its Third Forward Drive position P3 back to its Neutral position N, the operating finger 103 is effective to correspondingly actuate the second gear shifting rod of the transmission unit from its Third Forward Drive position back to its Neutral position to move out of mesh the "synchromesh" gears of the transmission unit that had been moved into mesh to obtain the second forward drive speed of the transmission unit.

It may be noted from the above that: (1) fluid under pressure acts in one direction on the effective area of the upper face of the larger piston 42 to operate the second gear shifting rod of the transmission unit from its Neutral position to its Second Forward Drive position since the chamber 46 is vented at this time, (2) fluid under pressure acts in an opposite direction on the combined areas of the lower faces of hollow piston 41 and smaller piston 43 and also in said one direction on the effective area of the upper face of the larger piston 42 to operate the second gear shifting rod of transmission unit from its Second Forward Drive position back to its Neutral position by the difference in these opposing fluid pressure forces, (3) fluid under pressure acts in the said one direction only on the area of the lower face of the smaller piston 43 to operate the second gear shifting rod of the transmission unit from its Neutral position to its Third Forward Drive position since the chamber 45 is vented during this operation, and (4) fluid under pressure acts in one direction on the effective area of the upper face of the larger piston 42 and also in an opposite direction on the entire area of the lower face of smaller piston 43 to operate the second gear shifting rod of the transmission unit from its Third Forward Drive position back to its Neutral position by the difference in these opposing fluid pressure forces, it being understood that fluid under pressure in the chamber 46 acting on the hollow piston 41 maintains it in the position in which it is shown in FIG. 2 to prevent further downward movement of the differential power piston 40 past its Neutral position. Consequently, it is apparent that the second gear shifting rod of the transmission unit is operated from its Neutral position to its Second Forward Drive position by a force that exceeds the force that operates this gear shifting rod of the transmission unit from its Neutral position to its Third Forward Drive position. Also, it is apparent that the second gear shifting rod of the transmission unit is operated from its Second Forward Drive position back to its Neutral position by a force that exceeds the force that operates the second gear shifting rod of the transmission unit from its Third Forward Drive position back to its Neutral position. By assuming appropriate diameters for the pistons 41, 42 and 43, the above statements can be mathematically proven to be true.

Since the handle 118 has been returned to its First Neutral position N1 (FIG. 1), it can now be moved in either direction in its longitudinal path. Accordingly, since the operator desires to operate the transmission unit to its fourth forward drive speed, he will immediately move the handle 118 in its longitudinal path in the direction of the left hand, as viewed in FIG. 1, and consequently the rotary valve element in the same direction within the bore in the casing 116 against the yielding resistance of the caged spring, out of its First Neutral position N1 to its Second Neutral position N2 in which position the hereinbefore-mentioned one and other arms of the cruciform portion of the handle 118 can be received respectively in the slot 128 in the handle guide member 126 or in the slot 128 in the handle guide member 127 accordingly as the handle 118 is rocked in the hereinbefore-mentioned one direction to its position C2 or in the hereinbefore-mentioned opposite direction to its position CC2.

Upon the handle 118 reaching its Second Neutral position N2, the operator, without releasing his grip on the handle 118, will, without delay, rock the handle 118 in the hereinbefore-mentioned opposite direction out of its Second Neutral position N2 to its position CC2 (FIG. 1) in which position the hereinbefore-mentioned other arm of the cruciform portion of the handle 118 contacts the end of the slot 128 in the handle guide member 127 (FIG. 1). In rocking the handle 118 out of its Second Neutral position N2 to its position CC2, the rotary valve element is rotated within the bore in the casing 116 to a position in which the pipe 121 and the corresponding port and passageway in the casing 116 are connected to atmosphere, as explained in the hereinbefore-mentioned Patent No. 3,031,853, thus venting the chamber 28 in the cylinder 5 while all of the other pipes, passageways and corresponding ports opening at the surface of the bore remain charged with fluid under pressure from the reservoir 3.

As fluid under pressure is thus vented from the chamber 28 in the cylinder 5, as just explained, and at a rate in accordance with the setting or adjustment of the needle valve device 121b, the fluid under pressure supplied to the chamber 29 in this cylinder moves the power piston 23 and the piston rod 30, connected thereto within this cylinder, upward until the upper face of the hollow piston 24, which is carried upward by the power piston 23 contacting flange 26 on the hollow piston 24, contacts the wall 35. It may be noted that the upper end of hollow piston 25 is held in contact with the lower side of the snap ring 20 by the fluid under pressure present in the chamber 29 and does not move from the position shown in FIG. 2. As the power piston 23 is thus moved upward from the position in which it is shown in FIG. 2 to the position in which the upper face of the hollow piston 24 contacts the wall 35, the piston rod 30 connected at one end to the power piston 23 will be shifted from its Neutral position N to a second position, for example, such as a Fourth Forward Drive position P4.

As the piston rod 30 is thus shifted from one position to another position, the collar 91 (FIG. 4) secured to the piston rod 30 by the set screw 93 (FIG. 7), is effective, through the double yoke 87 which is keyed to shaft 79 by key 90 (FIG. 4), to rock the shaft 79 and the finger 81, secured to this shaft by set screw 82, in a clockwise direction, as viewed in FIG. 5, to correspondingly actuate the above-mentioned third gear shifting rod of the transmission unit from its Neutral position to its Fourth Forward Drive position to bring into mesh the proper "synchromesh" gears of the transmission unit to obtain the fourth forward drive speed of the transmission unit.

Let it now be assumed that the operator desires to operate the transmission unit to change from the fourth forward drive speed to the fifth and highest drive speed, it being assumed that the engine load condition is favorable for such a change of speed. In order to effect this speed change, the operator will rock the handle 118 in the hereinbefore-mentioned one direction out of its position CC2 back through its Second Neutral position N2 and to its position C2 (FIG. 1) in which position the hereinbefore-mentioned one arm of the cruciform portion of the handle 118 contacts the end of slot 128 in handle guide member 126 (FIG. 1). In rocking the handle 118 out of its position CC2 back through its Second Neutral position N2 to its position C2, the rotary valve element is rotated within the bore in the casing 116 of the control valve device 2 to a position in which fluid under pressure is resupplied to pipe 121 and through check valve device 121a to chamber 28 and the pipe 120 and the corresponding port and passageway in the casing 116 are connected to atmosphere, as explained in the hereinbefore-mentioned Patent No. 3,031,853, thus venting the chamber 29 in the cylinder 5 while all of the other pipes, passageways and corresponding ports opening at the surface of the bore remain charged with fluid under pressure from the reservoir 3.

As fluid under pressure is thus resupplied to pipe 121 and through check valve device 121a to the chamber 28 in the cylinder 6, and vented from the pipe 120 and chamber 29 in this cylinder at a rate in accordance with the setting or adjustment of the needle valve device 120b, the fluid under pressure thus supplied to the chamber 28 in this cylinder moves the hollow piston 24, the power piston 23 and the piston rod 30 connected thereto within the cylinder downward until the lower end of hollow piston 24 contacts the upper side of the snap ring 20 to prevent further downward movement of hollow piston 24. After the hollow piston 24 is thus stopped, the fluid under pressure supplied to the chamber 28 in cylinder 6 is effective to continue to move the power piston 23 and piston rod 30 downward so that as the lower end of the power piston 23 contacts the flange 27 on the hollow piston 25 the hollow piston 25 is moved downward with the power piston 23 and piston rod 30 until the lower face of the hollow piston 25 contacts the upper face of the end pressure plate 8. As the power piston 23 is thus moved downward through the position in which it is shown in FIG. 2 to the position in which the lower face of the hollow piston 25 contacts the upper face of the end pressure plate 8, the piston rod 30, which is connected at one end to the power piston 23, will be shifted from its Fourth Forward Drive position P4 through its Neutral position N to another position, for example, such as a Fifth Forward Drive position P5.

As the piston rod 30 is thus shifted from one position to another position, the collar 91 is effective through the double yoke 87 to rock the shaft 79 and the finger 81 in a counterclockwise direction, as viewed in FIG. 5, to correspondingly actuate the above-mentioned third gear shifting rod of the transmission unit from its Fourth Forward Drive position back to its Neutral position to move out of mesh the "synchromesh" gears of the transmission unit that had been moved into mesh to obtain the fourth forward drive speed of the transmission unit, and then to actuate the third gear shifting rod from its Neutral position to its Fifth Forward Drive position to bring into mesh the proper "synchromesh" gears of the transmission unit to obtain the fifth and highest forward drive speed of the transmission unit.

Let it now be supposed that, while the transmission unit is in any one of its five forward drive positions, the operator desires to operate the transmission unit to change from the respective one of the five forward drive speeds to the reverse drive speed. To effect this speed change from a forward drive speed to the reverse drive speed, the operator will rock the handle 118 out of whichever one of its positions C1, C2, C3, CC1, CC2 and CC3 that it is in to the corresponding Neutral position N1, N2, or N3 in the longitudinal path of the handle and then move the handle 118 to its Third Neutral position N3 in the longitudinal path if the handle 118 is not rocked to this neutral position.

When the handle 118 is returned to any position in its longitudinal path, fluid under pressure is resupplied to whichever one of the pipes 120, 121, 122, 123 and 124 that had been previously vented to atmosphere. Therefore, whichever one of the power pistons 23, 23a, 40 (and its corresponding piston rod and gear shifting rod) that had been previously moved out of the position in which they are shown in FIG. 2 will be returned to the positions in which they are shown in FIG. 2 since whenever the handle 118 occupies any position in its longitudinal path, fluid under pressure will be supplied to all of the pipes 120, 121, 122, 123, 124 and 125 and the corresponding ports and passageways in the casing 116 of the control valve device 2.

Subsequent to movement of the handle 118 to its Third Neutral position N3, the operator, assuming conditions to be appropriate, will rock the handle 118 in the hereinbefore-mentioned opposite direction out of its Third Neutral position N3 to its position CC3 (FIG. 1) in which position the hereinbefore-mentioned other arm of the cruciform portion of the handle 118 contacts the end of the slot 130 in the handle guide member 127 (FIG. 1). In rocking the handle 118 out of its Third Neutral position N3 to its position CC3, the rotary valve element is rotated within the bore in the casing 116 of the control valve device 2 to a position in which the pipe 125 and the corresponding port and passageway in the casing 116 are connected to atmosphere, thus venting the chamber 28a in the cylinder 7 while all of the other pipes, passageways and corresponding ports opening at the surface of the bore remain charged with fluid under pressure from the reservoir 3.

As fluid under pressure is thus vented from the chamber 28a in the cylinder 7, as just explained, and at a rate in accordance with the setting or adjustment of the needle valve device 125b, the fluid under pressure supplied to the chamber 29a in this cylinder moves the power piston 23a and the piston rod 30a, connected thereto within this cylinder, upward from the position shown in FIG. 2 until the upper face of the hollow piston 24a which is carried upward by the power piston 23a contacting flange 26a on the hollow piston 24a, contacts the wall 35a. It may be noted that the upper end of hollow piston 25a is held in contact with the lower side of the snap ring 20a by the fluid under pressure present in the chamber 29a and does not move from the position shown in FIG. 2. As the power piston 23a is thus moved upward from the position in which it is shown in FIG. 2 to the position in which the upper face of the hollow piston 24a contacts the wall 35a, the piston rod 30a connected at one end to the power piston 23a will be shifted from its Neutral position N to a second position, for example, such as a Reverse Drive position R1.

As the piston rod 30a is thus shifted from one position to another position, the collar 91a, secured to the piston rod 30a by the set screw 93a, is effective, through the double yoke 87a, which is keyed to the shaft 101 by key 90a, to rock the shaft 101 and the finger 81a, secured to this shaft by set screw 82a, in a clockwise direction, as viewed in FIG. 8, to correspondingly actuate the above-mentioned first gear shifting rod of the transmission unit from its Neutral position to its Reverse Drive position to bring into mesh the proper "non-synchromesh" gears of the transmission unit to obtain the reverse drive position of the transmission unit.

Now whenever the operator desires to operate the transmission unit to change from the reverse drive position of the unit to the first forward drive speed and then successively through the second, third, fourth and fifth forward drive speeds, he will rock the handle 118 in the hereinbefore-mentioned one direction out of its position CC3 (FIG. 1) back to its Third Neutral position N3 in its longitudinal path. As the handle 118 is thus returned to its Third Neutral position N3, the rotary valve member within the bore in the casing 116 of the control valve device 2 is returned to a corresponding position. Consequently, fluid under pressure will again to supplied through the port and corresponding passageway to which the pipe 125 is connected and thence unrestrictedly through this pipe and the check valve device 125a to the previously vented chamber 28a in the cylinder 7, it being understood that all of the other ports, passageways, and pipes remain charged with fluid under pressure, as previously explained.

Upon the resupply of fluid under pressure to the chamber 28a in the cylinder 7, this fluid under pressure acts on the upper faces of the hollow piston 24a and the power piston 23a. The fluid under pressure acting in the chamber 29a on the entire lower face of the power piston 23a establishes a force acting in an upward direction that exceeds the force established by the fluid under pressure in the chamber 28a acting on the upper face of the power piston 23a since the effective area of the lower face of the power piston 23a exceeds the effective area of the upper face of this power piston by the cross-sectional area of piston rod 30a. However, the effective area of the upper face of the hollow piston 24a is such that the fluid under pressure present in the chamber 28a and acting on the effective area establishes a force acting in a downward direction of such magnitude as to exceed the difference in the two unequal forces acting on the power piston 23 which differential force acts in an upward direction. Therefore, the fluid under pressure acting on the upper face of the hollow piston 24a is effective to move the hollow piston 24a and, through the intermediary of the flange 26a, the power piston 23a downward until the lower end of the hollow piston 24a contacts the upper side of the snap ring 20a in which position the power piston 23a and hollow piston 24a are shown in FIG. 2. As the power piston 23a is thus returned to the position in which it is shown in FIG. 2, the piston rod 30a connected thereto will be shifted from its above-mentioned Reverse Drive position R1 back to its Neutral position N.

As the piston rod 30a is thus shifted from its Reverse Drive position R1 back to its Neutral position N, the collar 91a is effective through the double yoke 87a to rock the shaft 101 and finger 81a in a counterclockwise direction, as viewed in FIG. 8, to correspondingly actuate the above-mentioned first gear shifting rod of the transmission unit from its Reverse Drive position back to its Neutral position to move out of mesh the "non-synchromesh" gears of the transmission unit that had been moved into mesh to obtain the reverse drive position of the transmission unit.

With the handle 118 now in its Third Neutral position

N3 and the piston rod 30a returned to its Neutral position N, as explained above, the operator can, as has been hereinbefore explained, by successively moving the handle 118 to that one of its remaining five positions corresponding to the first, second, third, fourth and fifth forward drive speeds of the transmission unit, correspondingly actuate the appropriate gear shifting rod to bring into mesh the proper gears of the transmission unit to obtain the desired forward drive speed of the unit, as hereinbefore described.

It may be noted from the description of operation of the cylinders 5 and 7 given above that: (1) fluid under pressure acts only over the entire area of the lower face of the respective power piston 23 or 23a to operate the third or first gear shifting rod of the transmission unit from its Neutral position to its second position, namely, Fourth Forward Drive position or Reverse Drive position, since the respective chamber 28 or 28a is vented at this time, (2) fluid under pressure acts in opposite directions on the opposite faces of the respective power pistons 23 or 23a to establish, because of the piston rod 30, 30a, a force acting in an upward direction, and fluid under pressure acts on the effective area of the upper face of the respective hollow pistons 24 or 24a to establish, because of the size of the effective area of the respective hollow piston 24 or 24a, a force acting in a downward direction that exceeds the corresponding upward force so that the third or first gear shifting rod of the transmission unit is shifted from its second position, namely, Fourth Forward Drive position or Reverse Drive position back to its Neutral position by the differential force resulting from these two unequal forces acting in opposite directions, (3) fluid under pressure acts only over the effective area of the upper face of the respective power piston 23 or 23a to operate the third or first gear shifting rod of the transmission unit from its Neutral position to its third position, namely, Fifth Forward Drive position or First Forward Drive position, respectively, since the respective chamber 29 or 29a is vented at this time, (4) fluid under pressure acts in opposite directions on the opposite faces of the respective power pistons 23 or 23a to establish, because of the piston rods 30, 30a, a force acting in an upward direction, and fluid under pressure acts on the effective area of the lower face of the respective hollow pistons 25 or 25a to establish a force acting in an upward direction so that the third or first gear shifting rod of the transmission unit is shifted from its third position, namely, Fifth Forward Drive position or First Forward Drive position back to its Neutral position by the sum of these two forces acting in the same direction. Consequently, it is apparent that the first and third gear shifting rods of the transmission unit are operated from their Neutral positions to their second positions, namely, Fourth Forward Drive position and Reverse Drive position respectively, by a force that exceeds the force that operates these gear shifting rods of the transmission unit from their Neutral position to their third positions, namely, Fifth Forward Drive position and First Forward Drive position, respectively. Also, it is apparent that the first and third gear shifting rods of the transmission unit are operated from their third positions, namely, Fifth Forward Drive position and First Forward Drive position, respectively, back to their respective Neutral positions by a force that exceeds the force that operates these gear shifting rods of the transmission unit from their second positions, namely, Fourth Forward Drive position and Reverse Drive position back to their respective Neutral positions. By assuming appropriate diameters for the power pistons 23, 23a, piston rods 30, 30a, and hollow pistons 24, 25, 24a and 25a, the above statements can be mathematically proven to be true.

From the above, it is apparent that an operator, by moving the operating handle 118 in its longitudinal path to one or another of its three Neutral positions N1, N2 and N3, and then rocking the handle in one direction or in an opposite direction, can control the operation of one or another of the three cylinders 5, 6 and 7 and a device connected thereto, such as, for example, one of three gear shifting rods of a transmission unit having five forward drive speeds and a reverse drive speed.

Having now described the invention, what I claim as new and desire to secure by Letters Patent, is:

1. A fluid motor device comprising a cylinder having a bore, a fixed piston stop means carried by said cylinder intermediate the ends thereof and projecting into the bore of said cylinder, a pair of coaxially aligned cylindrical hollow pistons, each open at both ends, respectively slidably operable in said bore on opposite sides of said stop means and each having at its outer end a flange extending radially inward, a cylindrical power piston member slidably operable at its opposite ends within said hollow pistons respectively between said flanges, a piston rod secured to one end of said cylindrical power piston member and extending therefrom, and a pair of removable pressure heads closing opposite ends respectively of the bore in said cylinder and providing access to the bore when removed from said cylinder, said pressure heads cooperating respectively with a corresponding one of said hollow pistons and a corresponding end of said cylindrical power piston member and said cylinder to form a pair of chambers one on each side of said cylindrical power piston, said hollow pistons being shiftable by the force thereon of fluid under pressure supplied simultaneously to the corresponding chamber on one and on the other side of said cylindrical power piston member to one position determined by contact of the adjacent ends of said hollow pistons with the said fixed piston stop means, to cause the corresponding inwardly extending flanges on said hollow pistons to correspondingly shift the cylindrical power piston member to an intermediate position in said cylinder, and each one of said hollow pistons being shiftable out of its said one position by said cylindrical power piston member when fluid under pressure is vented from the corresponding chamber on the one or on the other side of said cylindrical power piston member to a different position in which the respective hollow piston is in contact with the corresponding pressure head and which determines the limit of movement of the cylindrical power piston member in a corresponding direction out of its intermediate position.

2. A fluid motor device, as claimed in claim 1, further characterized in that said power piston member comprises two spaced pistons of equal diameters connected by a cylindrical portion of smaller diameter than said pistons, said power piston member and said hollow pistons providing therebetween at said smaller diameter portion of said power piston an annular chamber, and also in that said cylinder is provided with port means constantly opening said annular chamber to atmosphere.

3. A fluid motor device comprising a cylinder having a bore and a coaxial counterbore extending inwardly from one end of said cylinder a distance substantially one-half the length of said cylinder to form a shoulder at the inner end of the counterbore; a hollow piston open at both ends and slidably operable in the counterbore, the inner diameter of said hollow piston being less than the diameter of the bore in said cylinder; a cylindrical power piston member carrying at one end a larger piston slidably operable in the bore in said cylinder and at the opposite end a smaller piston slidably operable in said hollow piston and carrying, intermediate the larger and and smaller pistons, a flange extending radially outward; a piston rod secured to the larger piston of said cylindrical power piston member and extending therefrom in a direction away from the smaller piston; and a pair of removable pressure heads respectively closing a corresponding end of the bore in said cylinder, one of said pressure heads cooperating with said hollow piston, the smaller piston of said cylindrical power piston member and the corresponding end of said cylinder to form a first chamber and the other of said pressure heads cooperating with the larger piston of said cylindrical power piston member and the corresponding end of said cylinder to form a second chamber, said hollow piston and said cylindrical power piston member being shiftable by the force thereon of fluid under pressure supplied simultaneously to said first and said second chambers to one position determined by contact of the end of said hollow piston with the shoulder at the inner end of the counterbore in said cylinder and by the contact of the outwardly extending flange carried by the cylindrical power piston member with that end of said hollow piston that contacts the shoulder, said hollow piston being shiftable out of its said one position by said cylindrical power piston member, via the flange thereon, simultaneously as said cylindrical power piston member is shifted in one direction out of its one position when fluid under pressure is vented from said first chamber to a first different position in which the hollow piston is in contact with said one pressure head, and said cylindrical power piston member being shiftable out of its said one position in a direction opposite said one direction independently of said hollow piston by fluid under pressure present in said first chamber when fluid under pressure is vented from said second chamber to a second different position in which the larger piston carried at the said one end of said cylindrical power piston member is in contact with said other pressure head and which determines the limit of movement of the cylindrical power piston member in a corresponding direction out of its said one piston.

4. A fluid motor device comprising two parallel spaced-apart cylinders of equal length each having a bore; an annular fixed piston stop means carried by each cylinder intermediate its ends and on the interior thereof; hollow piston means open at both ends slidably operable in the bore of each cylinder, the inner diameter of said hollow piston means being less than the inner diameter of said annular fixed piston stop means; a cylindrical power piston means slidably operable within said hollow piston means, said cylindrical power piston means, said hollow piston means and said annular fixed piston stop means cooperating to determine an intermediate position of the cylindrical power piston means in said cylinder; and a pair of removable pressure heads for supporting the corresponding ends of the two parallel cylinders to close one end of the bore in the respective cylinders, said pressure heads serving to connect said two parallel spaced-apart cylinders and cooperating respectively with each one of said hollow piston means and with each one of said cylindrical power piston means and a corresponding end of each cylinder to form in each cylinder a pair of chambers one on each side of each of the cylindrical power piston means, said hollow piston means in each of said cylinders being shiftable by the force thereon of fluid under pressure supplied simultaneously to the corresponding chamber on one and on the other side of said cylindrical power piston means of each of said cylinders to one position determined by contact of said hollow piston means with said annular fixed piston stop means to cause shifting of the corresponding cylindrical power piston means to a corresponding intermediate position in the respective cylinder, and said hollow piston means being shiftable out of its said one position by said cylindrical power piston means when fluid under pressure is vented from one chamber in the corresponding cylinder to a different position in which the respective hollow piston means is in contact with the corresponding pressure head and which determines the limit of movement of the cylindrical power piston means in a corresponding direction out of its intermediate position.

5. A fluid motor mechanism comprising a plurality of separately formed cylinders arranged in spaced parallel relation to one another, each cylinder having a power piston operable therein and each power piston having a piston rod extending therefrom exteriorly of the corresponding cylinder in the same direction; a first common pressure head for all of said cylinders constructed so as to support one end of each cylinder in predetermined spaced relation to one another; a second common pressure head for all of said cylinders constructed so as to support the opposite end of each cylinder in said predetermined spaced relation to one another thereby to hold said cylinders in parallel relation, said second common pressure head having a plurality of spaced openings therein so located as to provide passage therethrough for the piston rods of the power pistons of said cylinders; a first finger secured to the center one of the three piston rods for limited longitudinal movement therewith in each direction from a position corresponding to an intermediate position of the respective power piston to which the center piston rod is secured; two rockably mounted fingers arranged one on each side of said first finger, said two fingers each being rockably mounted on said second common pressure head; and means operably connecting said two rockably mounted fingers respectively to the two piston rods on opposite sides of the center piston rod for effecting limited rocking movement of said two rockably mounted fingers in one direction or in an opposite direction from a position corresponding to an intermediate position of the respective power pistons to which the two piston rods on opposite sides of the center piston rod are secured.

6. A fluid motor device comprising three parallel spaced-apart cylinders each having a bore, power piston means in each of said cylinders shiftable therein by variation of fluid pressure forces thereon, a piston rod secured to each of the three power piston means and extending therefrom each in spaced-apart parallel relation to the other two piston rods, a pair of removable pressure heads each common to corresponding opposite ends of said three cylinders for supporting the corresponding ends of the three cylinders, one of said removable pressure heads having three bores arranged in the same spaced-apart relation as said three piston rods and through which bores said piston rods respectively project, a first finger secured to the center one of said three piston rods for limited longitudinal movement therewith in each direction from a position corresponding to an intermediate position of the power piston means to which the center piston rod is secured, two coaxially aligned shafts, each arranged at a right angle to said piston rods and on opposite sides of said first finger, bearing means rockably mounting each of said two coaxially aligned shafts on said one pressure head, a second and a third finger each secured to a respective one of said two coaxially aligned shafts, and means operably connecting each of said two coaxially aligned shafts with the corresponding one of the two piston rods that is on the same side of said center piston rod to effect rocking of the respective shaft and corresponding finger in response to shifting of the corresponding piston rod and its respective power piston means in either direction in accordance with variation of fluid pressure forces thereon.

7. A fluid motor device comprising three parallel spaced-apart cylinders each having a bore, power piston means in each of said cylinders shiftable therein by variation of fluid pressure forces thereon, three piston rods secured respectively to the three power piston means and all extending in the same direction away from the power piston means in a co-ordinated relationship, a pair of removable pressure heads each common to corresponding oppoiste ends of said three cylinders for supporting the corresponding ends of the three respective cylinders in parallel spaced relation to one another, one of said removable pressure heads having three bores arranged in the same co-ordinated relationship as said three piston rods through which bores said piston rods respectively project, a first actuating finger secured to the center one of said three piston rods for limited longituidnal movement therewith in opposite directions from a position corresponding to an intermediate position of the respective power piston means to which the center piston rod is secured, housing means integral with said one removable pressure head, two pairs of spaced-apart coaxially arranged bearing bosses carried by said housing, with each pair of bearing bosses having its respective bearing bosses arranged on opposite sides of one of the outside piston rods of said three piston rods, a shaft rotatably mounted in each pair of bearing bosses and extending through and beyond that one of the pair of bosses that is adjacent the other pair of bosses, a second and a third actuating finger each secured to that portion of a respective one of said shafts that extends beyond said one boss of the respective pair of bosses, a double yoke disposed between each pair of bosses in a position in alignment with the corresponding one of the outside piston rods of said three piston rods and keyed to the respective shaft carried by the corresponding pair of bosses, and a collar secured to each one of the outside piston rods and having two oppositely extending hubs which are received in the corresponding double yoke to establish a driving connection between said collar and said double yoke to effect rocking in a clockwise or a counterclockwise direction respectively of the corresponding shaft and actuating finger carried thereby in response to longitudinal shifting of the corresponding outside piston rod and its respective power piston means out of the intermediate position of said power piston means in one direction or in an opposite direction respectively, in accordance with variation of fluid pressure forces thereon.

References Cited in the file of this patent

UNITED STATES PATENTS

| | | |
|---|---|---|
| 653,212 | Carroll | July 10, 1900 |
| 2,379,306 | Larson et al. | June 26, 1945 |
| 2,698,603 | Macewka | Jan. 4, 1955 |
| 2,855,020 | McConnell | Oct. 7, 1958 |

FOREIGN PATENTS

| | | |
|---|---|---|
| 450,560 | Great Britain | July 21, 1936 |